(12) United States Patent
Srikanteswara et al.

(10) Patent No.: US 10,785,710 B2
(45) Date of Patent: Sep. 22, 2020

(54) SPECTRUM SHARING ARCHITECTURES AND METHODS

(71) Applicant: Intel Corporation, Santa Clara, CA (US)

(72) Inventors: Srikathyayani Srikanteswara, Portland, OR (US); Markus Dominik Mueck, Unterhaching (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/561,200

(22) PCT Filed: Dec. 17, 2015

(86) PCT No.: PCT/US2015/066358
§ 371 (c)(1),
(2) Date: Sep. 25, 2017

(87) PCT Pub. No.: WO2016/175900
PCT Pub. Date: Nov. 3, 2016

(65) Prior Publication Data
US 2018/0070296 A1 Mar. 8, 2018

Related U.S. Application Data

(60) Provisional application No. 62/154,594, filed on Apr. 29, 2015.

(51) Int. Cl.
*H04W 48/16* (2009.01)
*H04W 16/14* (2009.01)
(Continued)

(52) U.S. Cl.
CPC ............ *H04W 48/16* (2013.01); *H04W 16/14* (2013.01); *H04W 36/0088* (2013.01);
(Continued)

(58) Field of Classification Search
CPC . H04W 16/14; H04W 72/0453; H04W 24/08; H04W 88/08
See application file for complete search history.

(56) References Cited

U.S. PATENT DOCUMENTS

2008/0222020 A1* 9/2008 Stanforth ............... G06Q 40/04
705/37
2011/0286401 A1* 11/2011 Wijting .................. H04W 8/20
370/329
(Continued)

FOREIGN PATENT DOCUMENTS

WO 2014/191375 A2 12/2014

OTHER PUBLICATIONS

Hoon et al., "A Dynamic Spectrum Allocation between Network Operators with Priority-based Sharing and Negotiation" (Year: 2005).*

(Continued)

*Primary Examiner* — Dung Hong
(74) *Attorney, Agent, or Firm* — Schwabe, Williamson & Wyatt, P.C.

(57) ABSTRACT

An architecture is configured to be employed within a network entity. The architecture includes a repository management component and a spectrum controller. The repository management component is configured to collect sensing information, generate a sensing map based on the collected sensing information and maintain an available spectrum in a database. The spectrum controller is configured to identify and handoff bands of the available spectrum according to the sensing map.

22 Claims, 8 Drawing Sheets

(51) Int. Cl.
  *H04W 36/00* (2009.01)
  *H04W 48/10* (2009.01)
  *H04W 72/04* (2009.01)
  *H04W 88/10* (2009.01)
(52) U.S. Cl.
  CPC ........ *H04W 48/10* (2013.01); *H04W 72/0406* (2013.01); *H04W 88/10* (2013.01)

(56) References Cited

U.S. PATENT DOCUMENTS

| | | | | |
|---|---|---|---|---|
| 2012/0134328 A1* | 5/2012 | Gauvreau | ............. | H04L 5/0037 370/329 |
| 2012/0142382 A1 | 6/2012 | Stanforth et al. | | |
| 2012/0315855 A1* | 12/2012 | Li | .......................... | H04W 16/14 455/67.7 |
| 2013/0121177 A1* | 5/2013 | Morton | ................. | H04W 24/08 370/252 |
| 2013/0231124 A1* | 9/2013 | Vrzic | .................... | H04W 72/08 455/452.1 |
| 2014/0120970 A1* | 5/2014 | Jiang | ..................... | H04W 24/08 455/501 |
| 2014/0243009 A1* | 8/2014 | Nekovee | ............... | H04W 16/14 455/454 |
| 2014/0274104 A1* | 9/2014 | Amanna, III | ......... | H04W 16/14 455/454 |
| 2015/0087347 A1* | 3/2015 | Roberts | ................. | H04W 16/14 455/509 |
| 2015/0358968 A1* | 12/2015 | Malladi | ................. | H04W 16/14 455/454 |
| 2015/0373554 A1* | 12/2015 | Freda | .................... | H04L 5/0073 455/450 |

OTHER PUBLICATIONS

International Search Report dated Mar. 14, 2016 for International Application PCT/US2015/066358.

* cited by examiner

SPECTRUM SHARING ARCHITECTURES AND METHODS

REFERENCE TO RELATED APPLICATION

This application is a National Phase entry application of International Patent Application No. PCT/US2015/066358 filed Dec. 17, 2015, which claims priority to U.S. Provisional Application No. 62/154,594, filed Apr. 29, 2015, entitled "5G 3GPP SPECTRUM SHARING ARCHITECTURE FOR LSA AND SAS", the contents of which are herein incorporated by reference in their entirety.

FIELD

The present disclosure relates to mobile wireless communication and spectrum sharing.

BACKGROUND

Mobile communications, including telecommunications, are an increasingly used and important form of communication. Typically, mobile communications use selected frequencies or spectrums for establishing and performing communications. However, the large number of communication devices or user equipment (UE) can overwhelm the available spectrum or frequencies.

One technique to utilize the available frequencies or spectrum is referred to as spectrum sharing. For this technique, an owner of a spectrum relinquishes all or a portion of its spectrum for periods of time, such as when the spectrum is unused. When relinquished, the spectrum is made available for other users or UEs to utilize for communication. However, this technique relies on the spectrum owner to report and identify when its spectrum is unused.

DETAILED DESCRIPTION

Figure 1:
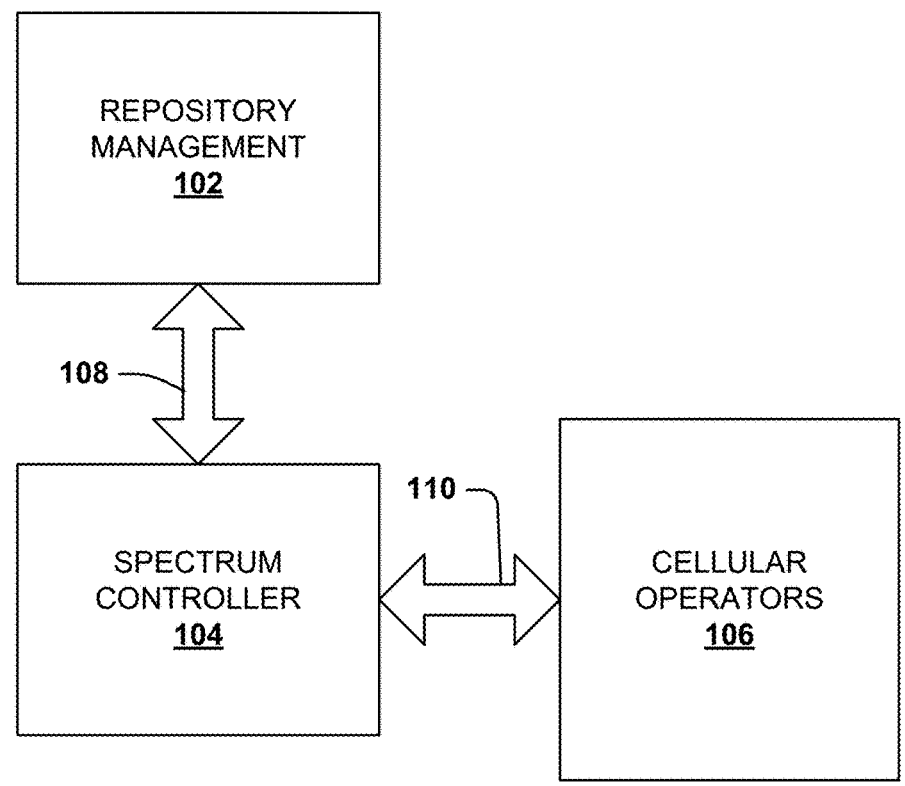
FIG. 1 is a diagram illustrating a spectrum sharing architecture or arrangement.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC, an electronic circuit and/or a mobile phone with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Spectrum sharing is a technique to better use available radio frequencies or spectrum. The spectrum is shared by various entities, including user equipment (UE) to address increased demand for mobile communications. As an example, a first mobile network owner (MNO) has or owns a spectrum. However, the owned spectrum is unused for a period of time in a geographic location. During this time, the owned spectrum can be allocated for and used by another MNO or licensee in the geographic location.

Thus, spectrum sharing is being looked at to address the growing need for more spectrum by cellular operators. In particular, the spectrum under 6 GHz is considered prime spectrum and is a strong candidate for spectrum sharing.

As an example, a licensed shared access (LSA) concept has been developed by the radio spectrum policy group (RSPG). The LSA concept includes mechanisms for introducing shared spectrum based solutions to allow mobile cellular operators to have access to additional licensed spectrum from other licensees that they would not normally get access to. The other licensees include, for example, public safety, government, and the like.

Another spectrum sharing concept involves using three tiers of priority for access. This concept is referred to as a spectrum access system (SAS). A first tier of cellular operators referred to as incumbents, could be for defense, medical or other high level priorities, and has the highest access priority. A second tier of cellular operators referred to as licensees, has access to available spectrum not being used by first tier or first tier owners. Finally, a third tier of cellular operators referred to as unlicensed operators has access to available spectrum not being used by the first or second tier operators.

The present disclosure includes various aspects for facilitating spectrum sharing. These aspects include a spectrum sharing framework architecture that supports a variety of spectrum sharing concepts, including LSA and SAS.

FIG. 1 is a diagram illustrating a spectrum sharing architecture or arrangement 100. The architecture 100 is adaptable to a variety of spectrum sharing concepts. Additionally, the architecture 100 includes spectrum sensing, which identifies whether frequencies or portions of a spectrum are available for use or sharing. Thus, the architecture 100 does not rely on operators, such as incumbents, to report when bands or areas of its spectrum are unused. The architecture 100 is described in a simplified format to aid understanding. Subsequent figures and description provide additional details. The architecture 100 can be implemented in circuitry and/or components.

The architecture 100 shown in FIG. 1 includes a repository management component 102 and a shared spectrum controller 104. The architecture 100 is used in conjunction with cellular operators or users 106.

The cellular operators 106 include evolved Node B (eNodeB), user equipment (UE), and the like. The operators 106 can include one or more classes of users including incumbent users/operators, licensees, tiered users, mobile network operators (MNO), users/operators using generic authentication architecture (GAA) and the like. Each operator can have spectrum rights, such as owned spectrum, priority levels for spectrum portions, and the like. It is also appreciated that the spectrum rights can be based on geographic location.

The cellular operators 106 can include a mobile or wireless device having various components being illustrated for signal communication (e.g., a mobile device, a computing device, a processing device or the like) that is configured to communicate in one or more different operating bands and in accordance with various communication standards (e.g., CDMA, GSM, LTE, LTE-A, or the like) with different data streams simultaneously or concurrently in different frequency ranges, such as with carrier aggregation (CA) or other simultaneous communication schemes for achieving higher data rates.

The repository management component 102 is configured to maintain a repository or database of available spectrum. The available spectrum is divided into portions, areas, or bands of frequencies. The bands of the spectrum are maintained in the repository with information including, for example, incumbent owner, current user, level of use, geographic location and the like. The repository also includes information about each operator or user, such as whether it is an incumbent user, licensee, unlicensed, priority level, and the like.

Additionally, the repository management component 102 is configured to sense and/or utilize sensed use of the available spectrum, referred to as sensing information. The sensing information is collected and used to generate a sensing map, which includes information such as location, coordinates, time and/or date, confidence, energy levels, devices present, energy patterns and the like. In addition to the sensed use information, the repository management component 102 is configured to obtain registered user information or user maps. The user maps includes use information similar to the sensing maps, such as location, time and/or date, confidence, energy levels, devices present, energy patterns and the like.

The repository management component 102 is also configured to store and maintain a map of rules for spectrum use in each geographic area. The map of rules can indicate tier structure, priority levels and the like. The map of rules may be provided or determined by a regulatory body.

The shared spectrum controller 104 is configured to permit and grant/deny access of the bands of the spectrum to the operators 106. The controller 104 interacts with the repository management component 102 to respond to spectrum/band requests from individual cellular operators. The spectrum/band request can include a specific requested band or be for any available band. The spectrum controller 104 obtains the operator information, such as tier level, owned or incumbent bands, bandwidth or requested spectrum size, duration of use requested, geographic location of desired use, and the like. Additionally, the spectrum controller 104 obtains and analyzes the map of rules from the component 102. Furthermore, the spectrum controller 104 obtains sensing maps and user maps to identify available bands.

Based at least partially on the spectrum request, the operator information, the map of rules, the sensing maps and the user maps, the spectrum controller 104 grants or denies the request. If granted, the spectrum controller 104 initiates handoff messaging to the requestor and provides updated information to the repository management component 102. The handoff messaging If denied, the spectrum controller 104 messages the requestor and may include information on the denial.

The spectrum controller 104 and the cellular operators 106 communicate via an interface 110. It is appreciated that the controller 104 and the operators 106 can communicate using other suitable mediums.

In one example, the repository management 102 and the spectrum controller 104 are part of an entity outside the operators or UE, such as a network entity. In another example, portions of the architecture 100 are located within one or more UEs. In another example, portions of the architecture 100 are located within one or more base stations or eNodeBs. The architecture 100 can encompass are particular region, such as a country, geographic region, and the like.

Figure 2:
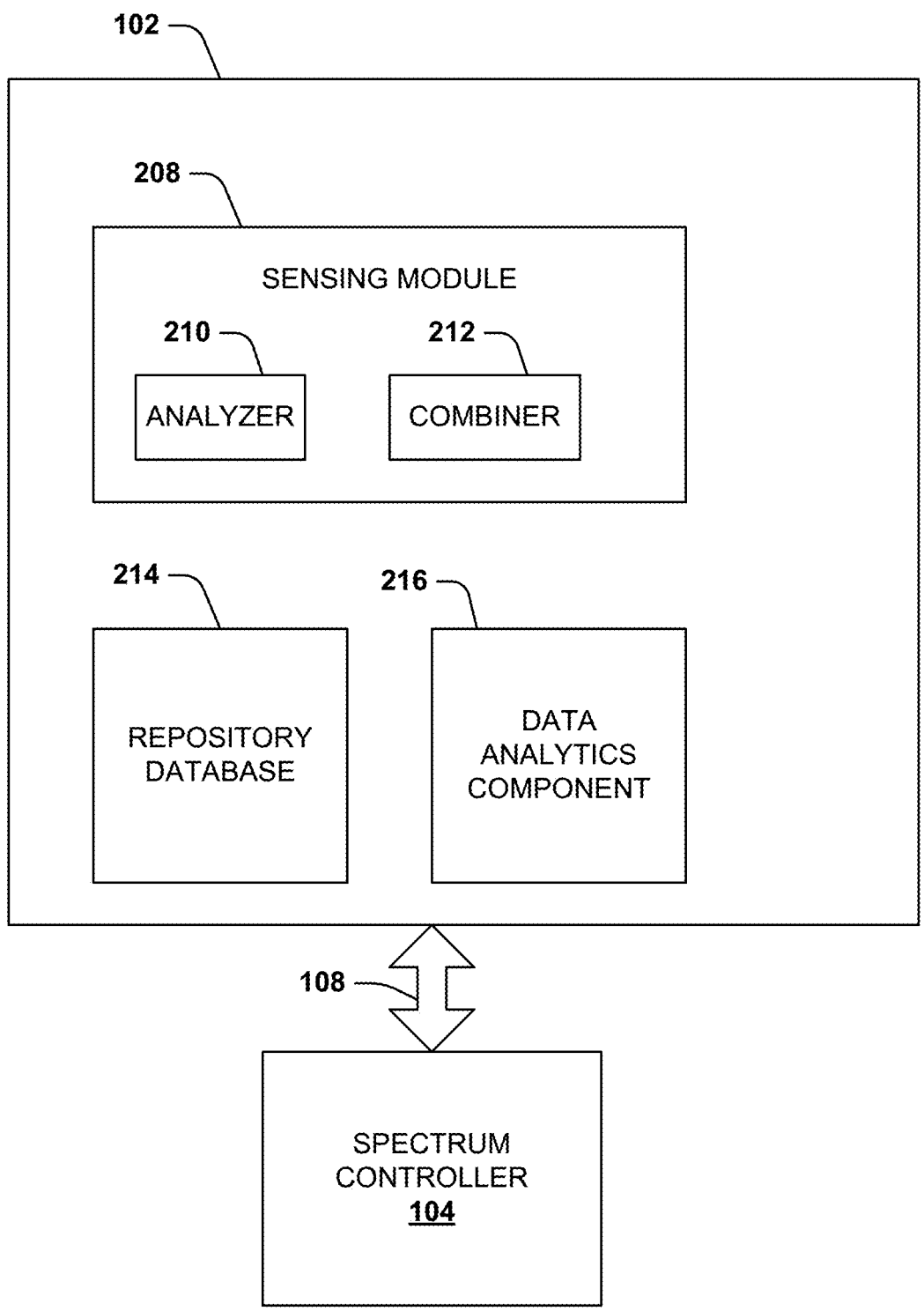
FIG. 2 is a diagram illustrating a repository management component in greater detail.

FIG. 2 is a diagram illustrating a repository management component 102 in greater detail. The component 102 interacts with and responds to the spectrum controller 104 and uses sensing information to facilitate spectrum sharing. The repository management component 102 is shown with an example of a suitable arrangement and components, however it is appreciated that other arrangements of components are contemplated.

Communications between the component 102 and the controller 104 are via a repository interface 108.

The repository management component 102 includes a sensing module 208, a repository database 214 and a data analytics component 216. The repository database 214 is configured to store and/or maintain available spectrum and operators. The available spectrum is segmented into portions or bands of frequencies. For example, an available spectrum band could include 4.1 to 4.3 GHz. Each available spectrum band is stored in the database with associated information including, but not limited to, owner, incumbent owner, current user, level of use and the like. Additionally, each operator can also have associated information stored including, for example, whether the operator is an incumbent, licensee, unlicensed, MNO, GAA, and the like.

Additionally, the repository database 214 is also configured to include a spectrum rules map and a user map. The spectrum rules map provides rules for sharing and allocating available spectrum bands, such as authorized users, duration of sharing, reporting requirements and the like. The spectrum rules map is typically generated or provided by a regulatory body, however other sources can be used to generate the spectrum rules map. Similarly, the user map provides rules for sharing and allocating available spectrum bands. The user map is generated from operators, such as registered users and the like, and/or sensing information. The registered users are operators that directly provide band usage information as their sensing information.

The user map includes location or field entries of where users/operators are present and confidence levels associated with the field entries. The fields can include, for example, x-y-z coordinates, power levels, percentage of time active, type of activity (periodic), times of day when utilized, and the like. The information in the user map can be generated voluntarily from the operators, such as by base stations and UEs reporting where they are, or from sensing information. For example, a WiFi device might sense the presence of other devices on some channels in its vicinity and provide that information to the spectrum controller 104. Another example is a base station that reports active devices in its vicinity on a list of channels to use.

The data analytics component 216 is configured to generate usage patterns of operators, including incumbents or other users, to generate interference level predictions or models based on usage history of the sharing spectrum. In one example case, the data analytics component 216 tracks when operators requested and vacated bands as the usage history. Based on this information, the data analytics component 216 reviews the history of various operators in the database 214 and calculates the level of activity at any given time at a given region based on the usage history. The usage history is continuously updated as bands are requested and vacated by operators. For example, if a group of bands, referred to as a channel, typically gets crowded at a particular time of day, a different channel or bands may be allocated. In another example case, the data analytics component 216 is configured to additionally include and consider potential movement of UEs. The usage history includes when and where operators requested and vacated bands.

The sensing module 208 is configured to combine and/or obtain sensing information and modify entries of the repository database 214 based on the sensing information. The sensing module 208 can combine sensing information from multiple sources to facilitate reliability of the sensing information. The multiple sources include cellular operators, evolved Node B (eNodeB), user equipment (UE), GAA devices, dedicated sensing device networks, and the like. Further, the sensing module 208 can utilize the interface 110 to obtain at least a portion of the sensing information.

The sensing module 208 gathers the sensing information from the various sources and creates a sensing map. The sensing module 208 includes an analyzer 210 and a combiner 212. The data analyzer 210 is configured to collect inputs from different sources to create the sensing map. The different sources include, for example, UEs (cellular and WiFi), EnodeB, sensing devices, aggregated information, and the like. The sensing map, for example, indicates the number of users and interference levels in each band. The sensing map can also include a presence or absence of an incumbent user, priority user and the like.

The data combiner 212 is configured to combine the multiple inputs and update the sensing map stored in the repository database 214. These multiple inputs can be independent of the data analyzer 210. The data combiner 212 can also generate a confidence level for the information in the sensing map. For example, if a number of the inputs indicate a presence of a certain type of signal, a confidence of that metric is increased. Additionally, the data combiner is also configured to interpolate and average multiple sensing inputs to generate estimates of presence and/or absence of operators, such as incumbents, other devices and the like within a region.

It is appreciated that the repository management component 102 can omit the sensing module 208 in other embodiments. In these embodiments, the repository database 214 is updated from information provided by operators, such as incumbents, MNOs, and the like.

Figure 3:
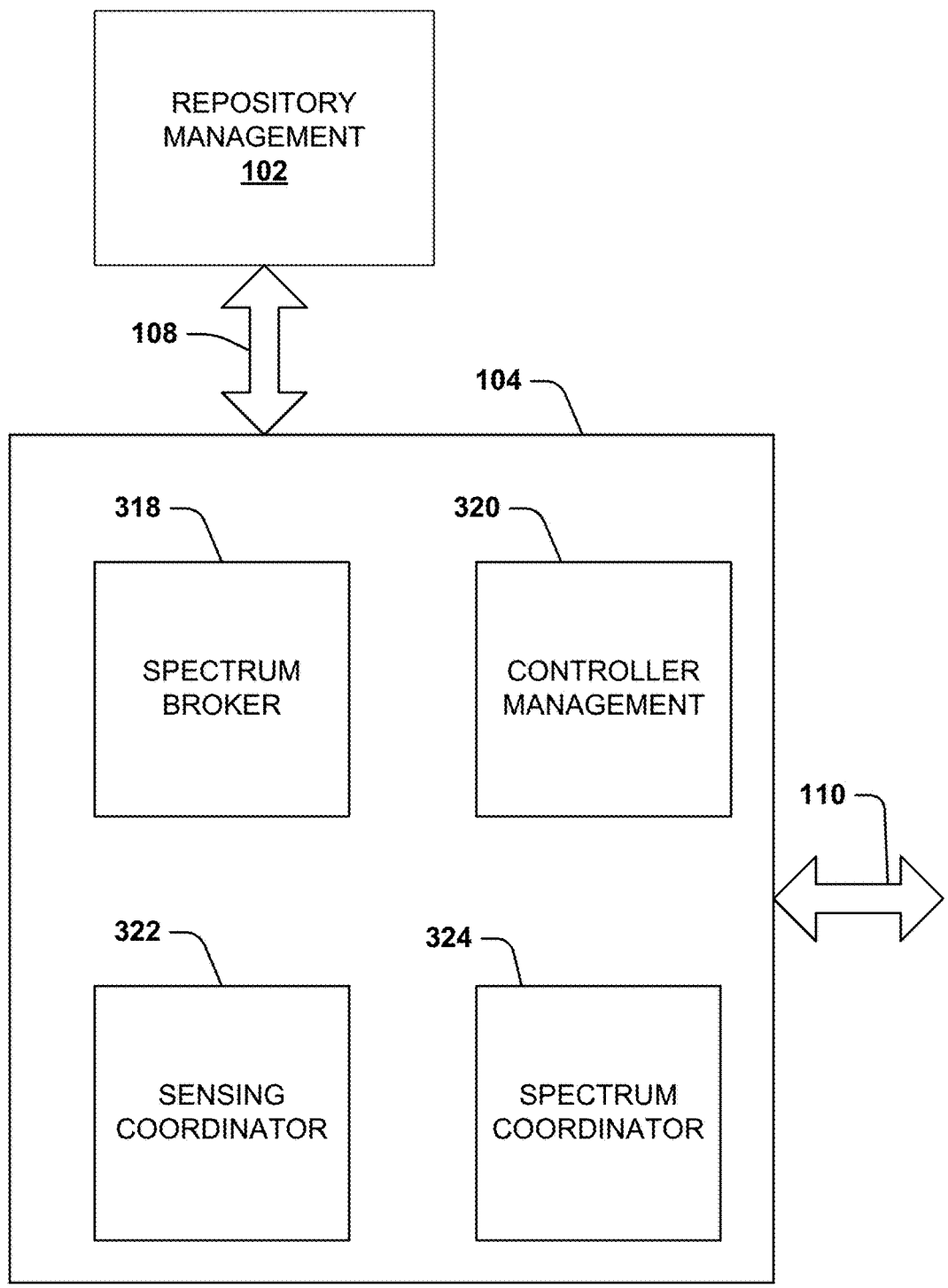
FIG. 3 is a diagram illustrating a spectrum controller that can be used in a spectrum sharing architecture.

FIG. 3 is a diagram illustrating a spectrum controller 104 that can be used in a spectrum sharing architecture. The spectrum controller 104 can be used in the architecture 100 described above. The spectrum controller 104 is shown herein with greater detail and includes four components. It is appreciated that alternate embodiments can utilizes different components, omit component(s), and/or include additional components not shown.

The spectrum controller 104 interacts with a repository management component 102 and can interact with cellular operators or users (not shown). The spectrum controller 104 includes a spectrum broker 318, a controller management 320, a sensing coordinator 322 and a spectrum coordinator 324.

The spectrum coordinator 324 is configured to perform spectrum handoff messaging and verify authority of users/operators to access the shared spectrum based on what tier they belong to. In one example, the spectrum coordinator 324 includes multiple or a plurality of tier coordinators, for example, one per tier, that handle spectrum handoff messaging for the assigned tier according to tier rules specific to the assigned tier.

For example, the LSA incorporates a first tier, incumbent users and a second tier, licensees or MNOs. The spectrum coordinator 324 handles handoff messaging according to whether a message originated from an incumbent or an MNO. In this example, the spectrum coordinator 324 includes a first tier coordinator and a second tier coordinator. The SAS incorporates a first tier, incumbent users; a second tier, MNOs; and a third tier, GAA. In this example, the spectrum coordinator 324 includes a first tier coordinator, a second tier coordinator and a third tier coordinator. It is appreciated that alternate embodiments can have varied numbers of tier coordinators.

The handoff messaging involves messaging operators or user of tiers when the spectrum or band they are using should be vacated. In one example, the coordinator 324 can provide alternate channels or bands that devices can switch to. The handoff messaging can include fields that include a cause of the handoff or vacating the band, such as incumbent or interference to higher priority tiers. The fields can include when the spectrum/band needs to be cleared, duration for which the band needs to be cleared, alternate channels that can be used, and the like. The handoff messaging can be sent to one particular device or UE or broadcast to a plurality of devices.

The spectrum coordinator 324 also utilizes access rules and exclusion zones specific to each tier. An exclusion zone is a zone where one or more tiers of operators are excluded from use. For example, an area surrounding an airport could be designated as an exclusion zone for tier 2 and tier 3 operators. The exclusion rules can designated time periods of exclusion, such as during school hours and the like.

The sensing coordinator 322 is configured to handle messages that have or include sensing information. The sensing information is collected and sent to another component, such as the sensing module 208 described with regard to FIG. 2. Additionally, the sensing coordinator 322 is configured to generate sensing requests or triggers that initiate obtaining sensing information. For example, the sensing coordinator 322 can generate sensing requests or triggers for network devices, such as UEs, eNodeBs and the like, that include sensing capability.

The triggers or sensing requests typically include parameters that indicate types of sensing information to obtain. Some examples of parameters and types of information requested are provided below.

One type is a geographic area or location in which sensing is to be performed. For example GPS coordinates and an area definition, such as a radius of a circle, can be used to determine the sensing area.

Another type is a number of measurement points within the sensing area which are to perform sensing. This is also referred to as sensing density and could specify measurement points per an area size, such as square yards.

Direction of sensing is another type. The sensing direction can be specified, for example, as omni-direction, sensing in an angle range, and the like.

The type of sensing performed can also be specified. The requested information can include, for example, power detection, correlation with a buffered sequence, and the like.

A preferred time or set time for sensing can also be specified. The time can be specified in terms of a specific date, hours, minutes and/or seconds. Alternatively, the sensing time can be based on an event, such as prior or after a scheduled data emission.

An indirect or direct type of sensing can be requested. For example, a line of sight sensing or other type of sensing can be specified.

The sensing coordinator 322 can trigger sensing of sensing devices in a variety of suitable ways. The trigger is in the form of a message from the sensing coordinator 322 and includes fields, such as duration of sensing, location of sensing and the like. The sensing coordinator 322 identifies target sensing entities, such as base stations, access points, mobile devices, dedicated sensors, devices operated by a particular cellular operation, and the like. The sensing entities can also be identified by geographic location. Once identified, the sensing coordinator 322 is configured to provide the trigger, which includes the sensing information parameters/types, to the identified sensing entities.

The sensing coordinator 322 generates sensing triggers based upon pre-determined time periods and/or defined events. For example, the sensing coordinator 322 can generate a trigger for sensing information every hour. As another example, the sensing coordinator 322 may generate a trigger for sensing information in response to movement of UE from one geographic location to another.

The spectrum broker 318 is configured to facilitate trading or brokering of spectrum bands between the various operators. Trade requests are generated by operators and received by the spectrum broker 318. The trade requests can include, for example, when the band is requested, where, power levels and the like. The spectrum broker 318 is configured to fill or deny the requests. If filled, for example, the spectrum broker 318 changes ownership of a band from a filling operator to the requesting operator. In one example, a first incumbent may agree to trade a first spectrum band with a second incumbent that is willing to share a second spectrum band with the first incumbent. The spectrum broker 318 is configured to update the repository management component 102 with trades.

In one example, a offer for a band is posted by an incumbent via the spectrum broker 318. The spectrum broker 318 solicits bids and allocates the offered band to the highest bid.

The controller management 320 is configured to handle initialization of assigned operators and allocated spectrum bands. This initialization includes identifying initial operator locations and spectrum bands they have.

Figure 4:
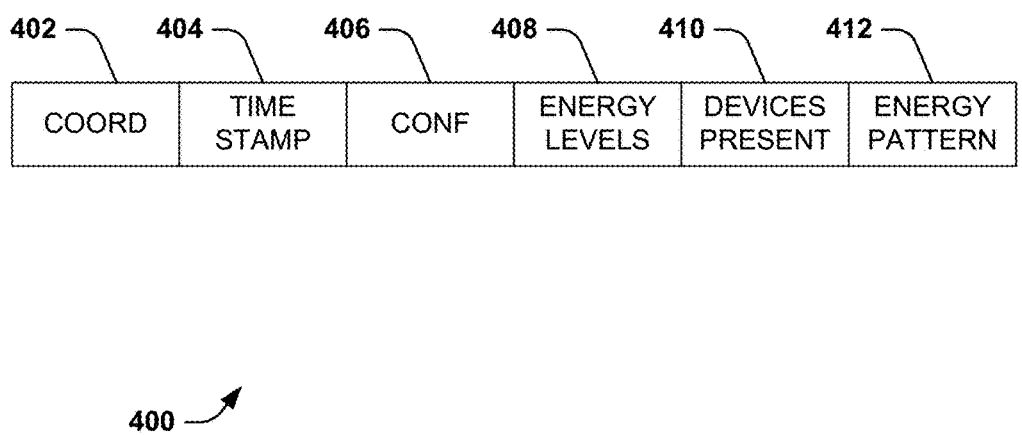
FIG. 4 is a diagram illustrating an example sensing map that can be created using a sensing module.

FIG. 4 is a diagram illustrating an example sensing map 400 that can be created using a sensing module, such as the sensing module 208 described above. The map 400 is provided as an example for illustrative purposes. It is appreciated that variations in the sensing map 400 are permitted and contemplated.

The sensing map 400 is developed by the sensing module 208 using sensing information from operators and network devices, as described above. The sensing map 400 includes coordinates 402, a time stamp 404, a confidence level 406, energy levels 408, a list of devices present 410 and an energy pattern 412. The coordinates 402 can include global positioning satellite (GPS) coordinates or other location specifying coordinates.

The coordinates 402 include position information for mobile operators using a spectrum band. The time stamp 404 includes one or more time entries associated with the sensing information. The confidence level 406 is a metric that indicates a confidence level for the information in the sensor map 400. In one example, the confidence level 406 is indicated as HIGH because multiple sources provided substantially similar sensing information used to generate the sensing map 400. In another example, the confidence level 406 is indicates as LOW because separate sources of sensing information provided conflicting information.

The energy levels 408 indicate interference levels for the spectrum band at issue. The devices present 410 indicate a number of devices or operators present proximate to the coordinates and/or associated with the spectrum band. The devices present 410 can also indicate a tier or type of device, such as incumbent, tier 1, and the like. The energy pattern 412 indicates energy levels and/or patterns associated with the spectrum band. In an example, the energy pattern can include usage of bands during periods of time.

Figure 5:
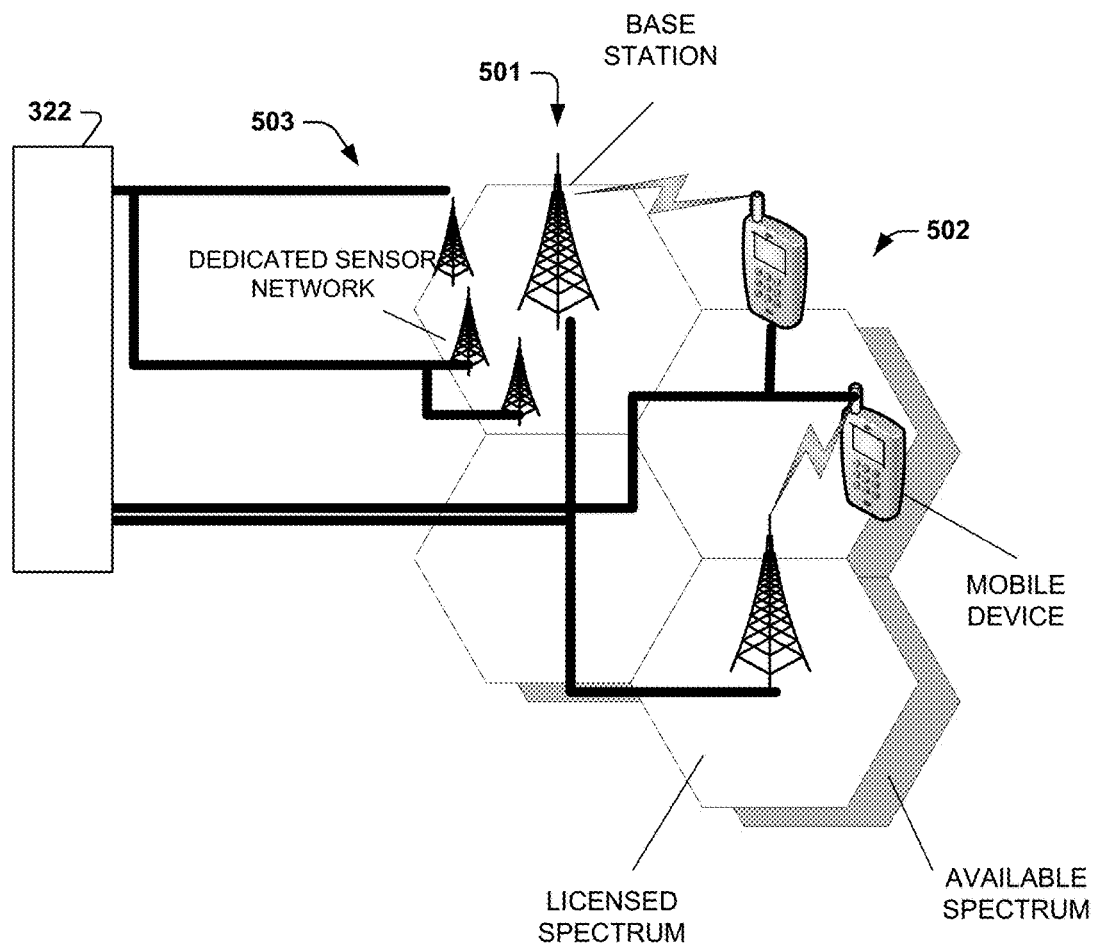
FIG. 5 is a diagram illustrating operation of a sensing coordinator with sensing devices.

FIG. 5 is a diagram illustrating operation of a sensing coordinator with sensing devices. The sensing coordinator 322 is also described above with regard to FIG. 3. The operation is provided as an example to facilitate understanding of obtaining and generating sensing information.

As described above, the sensing for the sensing information can be provided by a variety of suitable devices. FIG. 5 shows some example sensing devices. The sensing devices include base stations 501, mobile devices 502 and dedicated sensors 503 that have sensing capability. The sensing coordinator 322 communicates with the sensing devices via an interface, such as the interface 110 described above. The base stations 501, such as eNodeBs, may be under the control of a cellular operator, such as an MNO. The base stations 501 can be triggered to generate sensing information directly by the sensing coordinator 322. Alternately, the base stations can be triggered to generate the sensing information by the owner, such as the MNO. In one example, the sensing devices are configured or programmed to generate sensing information according to a periodic schedule. In another example, the sensing coordinator 322 triggers generation of the sensing information according to a periodic schedule.

The mobile devices 502, such as UEs, may also be under the control of a cellular operation, such as an MNO. The mobile device 502 can be triggered to generate sensing information directly by the sensing coordinator and/or by their network owner.

The dedicated sensors 503 are devices having sensing as a primary device function. The dedicated sensors 503 are part of a dedicated sensor network. The dedicated sensors 503 can also be triggered to initiate sensing by the sensing coordinator 322 or by a network owner, such as an MNO.

The sensing coordinator 322, in one example, passes the sensing information from the base stations 501, the mobile devices 502 and the dedicated sensor devices 503 to the sensing module 208 within the repository management component 102. In another example, the sensing coordinator 322 aggregates the information from the sensing devices prior to providing the sensing information to the sensing module 208.

Figure 6:
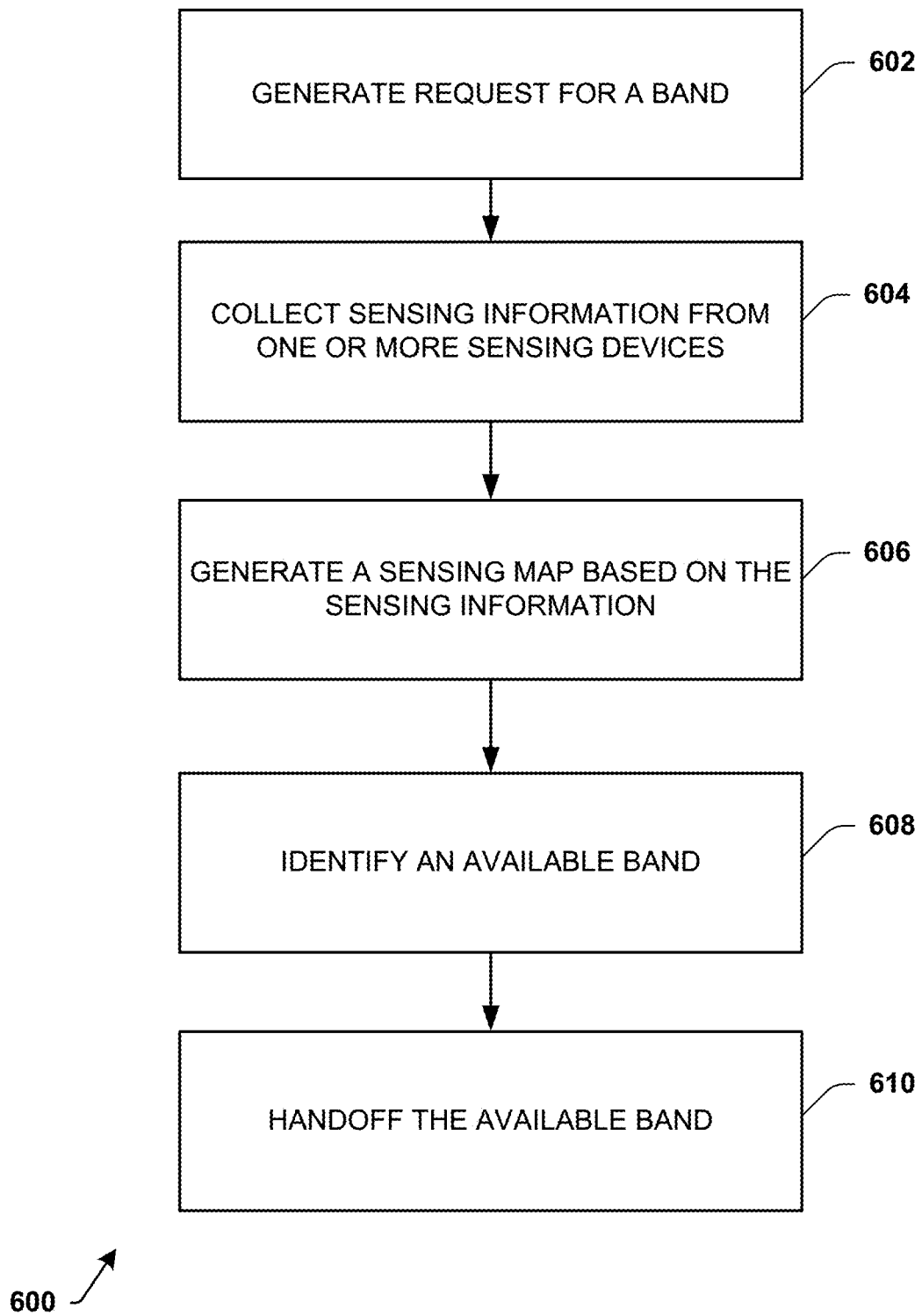
FIG. 6 is a flow diagram illustrating a method of sharing spectrum using sensing information.

FIG. 6 is a flow diagram illustrating a method 600 of sharing spectrum using sensing information. The method 600 compiles sensing information and uses the sensing information to perform spectrum handoff messaging.

The method 600 begins at 602, where a request for a band of an available spectrum is generated. The request can be generated by an operator, a user, a UE, and the like. The request typically includes request information including a size of the band, duration of time, geographic location and the like. The request is received by the spectrum controller.

Sensing information is collected from one or more sensing devices at 604. The sensing information can be generated based on the request or another trigger. The sensing information includes presence of incumbents at various band/frequencies, power levels, location, and the like. The one or more sensing devices can include dedicated sensor devices, UEs, and eNodeBs that include sensing capability. In one example, a sensing module collects and receives the sensing information.

A sensing map is generated at 606 based on the sensing information. The sensing information is analysed by a data analyser, such as the data analyser 210, to generate and/or update the sensing map. The sensing map includes, for example, location, interference levels, devices present, confidence levels and the like.

An available band is identified at 608 based on the sensing map and the request. The available band meets or matches the request information, such as duration of time, size of the band, geographic location and the like. A spectrum controller, such as the spectrum controller 104 described above, identifies the available band.

A handoff of the available band occurs at 610. A spectrum coordinator, such as the spectrum coordinator 324, described above, performs the handoff and messaging. The handoff is the change of assignment from the prior operator to the requester. Associated messaging includes fields for information, such as location, duration, and the like.

It is appreciated that variations in the method 600 are contemplated.

Figure 7:
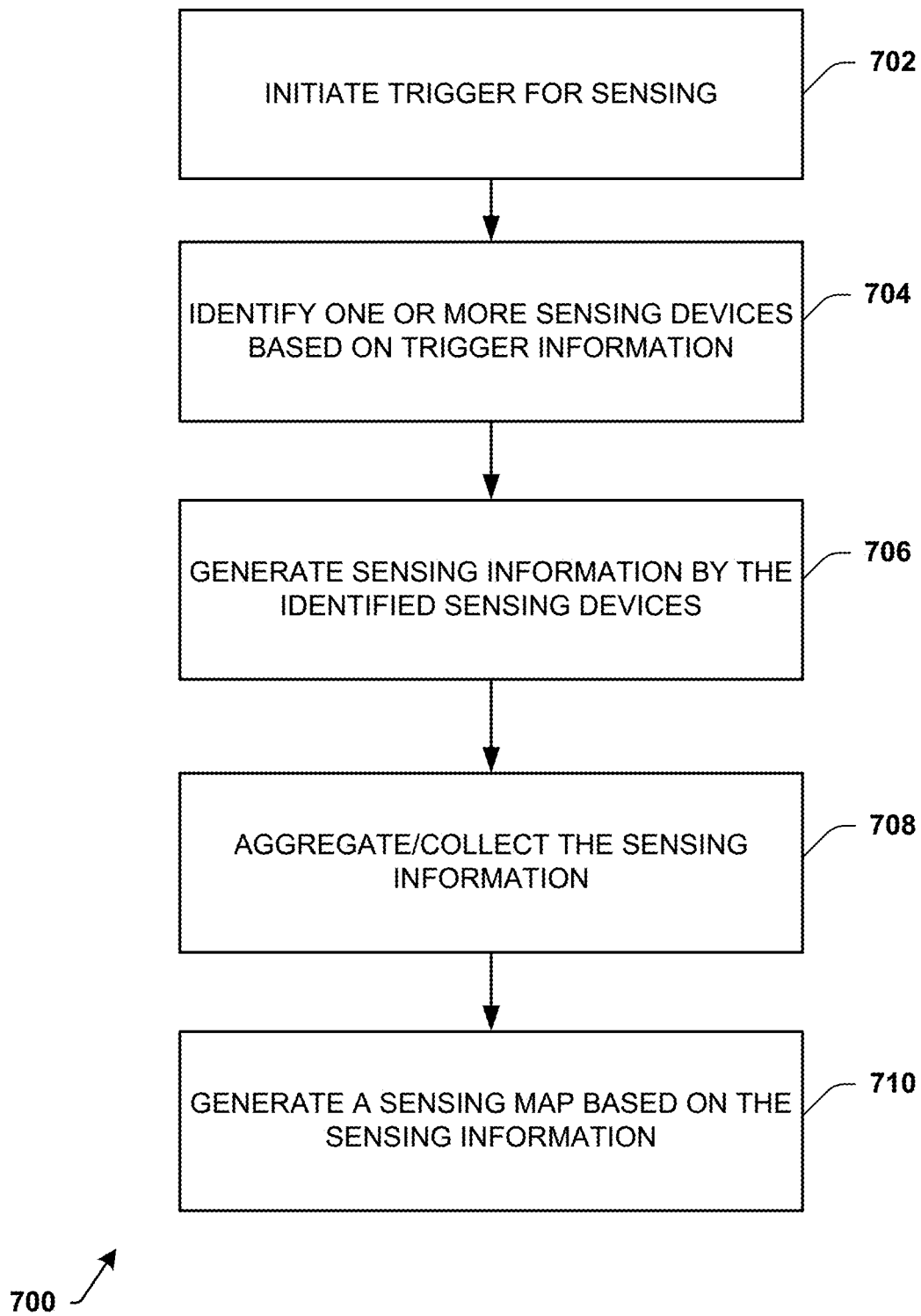
FIG. 7 is a flow diagram illustrating a method of generating sensing information.

FIG. 7 is a flow diagram illustrating a method 700 of generating sensing information. The method 700 selects sensing devices to generate the sensing information based on need or other factors.

The method begins at 702, where a trigger for sensing is initiated. The trigger includes information to be sensed, such as geographic location, power levels, interference levels, presence of incumbents and the like. The trigger, as described above, can be based on a pre-determined time period, event, request, and the like.

One or more sensing devices are identified at 704 based on the trigger information. For example, sensing devices within a geographic location specified in the trigger information can be identified. As another example, only sensing devices capable of generated power levels are identified. The sensing devices can include dedicated sensors, UEs, and eNodeBs.

The identified sensing devices generate sensing information at 706. The sensing information complies with the requested information of the trigger.

The sensing information from each of the sensing devices is gathered and aggregated at 708. The sensing information can be aggregated from an interface, such as the interface 110 described above. In one example, a sensing module such as the sensing module 208 is used to aggregate the sensing information.

The sensing information is analysed to generate a sensing map at 710. The sensor map includes metrics such as location/coordinates, a time stamp, confidence levels, energy levels, devices/users present, an energy pattern and the like. A data analyser, such as the analyser 210, can be used to generate the sensor map.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 8:
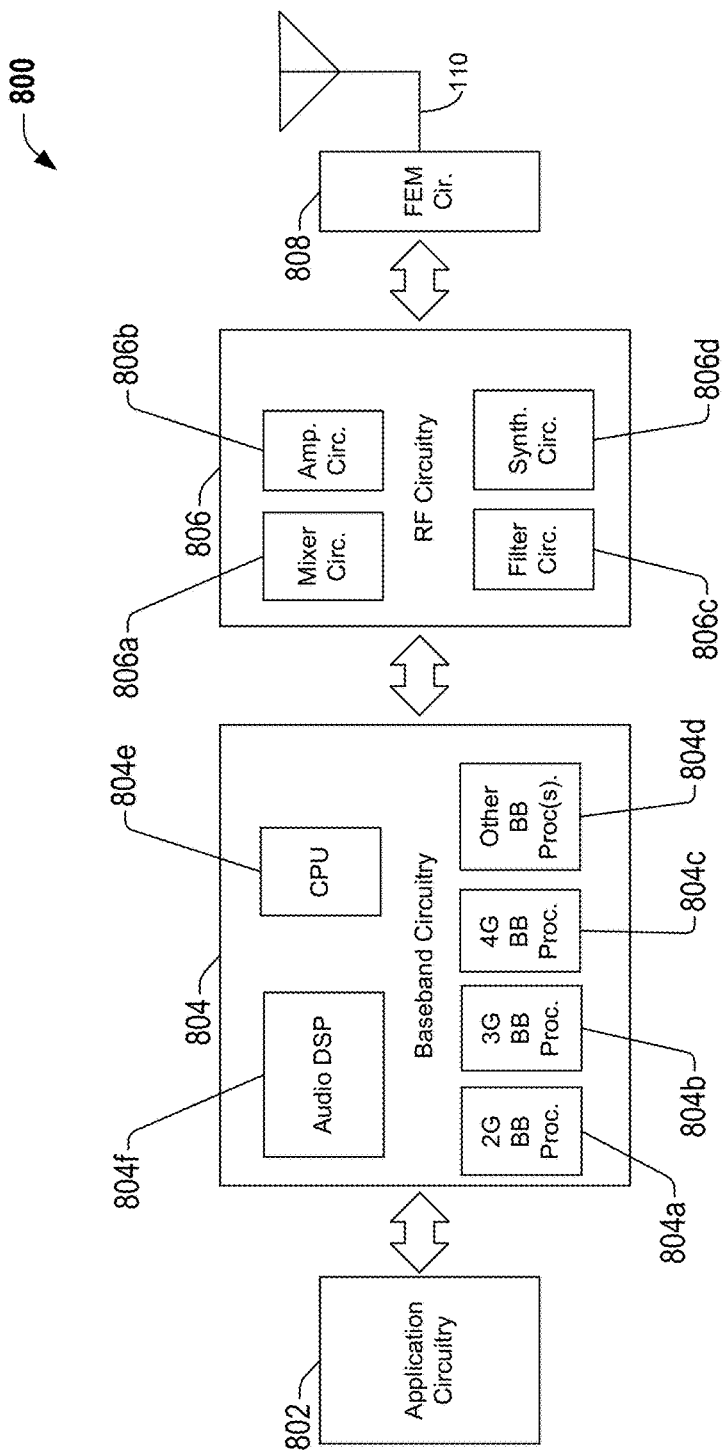
FIG. 8 illustrates, for one embodiment, example components of a User Equipment (UE) device.

Embodiments described herein can be implemented into a system using any suitably configured hardware and/or software. FIG. 8 illustrates, for one embodiment, example components of a User Equipment (UE) device 800. In some embodiments, the UE device 800 (e.g., the wireless communication device 101) can include application circuitry 802, baseband circuitry 804, Radio Frequency (RF) circuitry 806, front-end module (FEM) circuitry 808 and one or more antennas 880, coupled together at least as shown.

The application circuitry 802 can include one or more application processors. For example, the application circuitry 802 can include circuitry such as, but not limited to, one or more single-core or multi-core processors. The processor(s) can include any combination of general-purpose processors and dedicated processors (e.g., graphics processors, application processors, etc.). The processors can be coupled with and/or can include memory/storage and can be configured to execute instructions stored in the memory/storage to enable various applications and/or operating systems to run on the system.

The baseband circuitry 804 can include circuitry such as, but not limited to, one or more single-core or multi-core processors. The baseband circuitry 804 can include one or more baseband processors and/or control logic to process baseband signals received from a receive signal path of the RF circuitry 806 and to generate baseband signals for a transmit signal path of the RF circuitry 806. Baseband processing circuitry 804 can interface with the application circuitry 802 for generation and processing of the baseband signals and for controlling operations of the RF circuitry 806. For example, in some embodiments, the baseband circuitry 804 can include a second generation (2G) baseband processor 804a, third generation (3G) baseband processor 804b, fourth generation (4G) baseband processor 804c, and/or other baseband processor(s) 804d for other existing generations, generations in development or to be developed in the future (e.g., fifth generation (5G), 6G, etc.). The baseband circuitry 804 (e.g., one or more of baseband processors 804a-d) can handle various radio control functions that enable communication with one or more radio networks via the RF circuitry 806. The radio control functions can include, but are not limited to, signal modulation/demodulation, encoding/decoding, radio frequency shifting, etc. In some embodiments, modulation/demodulation circuitry of the baseband circuitry 804 can include Fast-Fourier Transform (FFT), precoding, and/or constellation mapping/demapping functionality. In some embodiments, encoding/decoding circuitry of the baseband circuitry 804 can include convolution, tail-biting convolution, turbo, Viterbi, and/or Low Density Parity Check (LDPC) encoder/decoder functionality. Embodiments of modulation/demodulation and encoder/decoder functionality are not limited to these examples and can include other suitable functionality in other embodiments.

In some embodiments, the baseband circuitry 804 can include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 804e of the baseband circuitry 804 can be configured to run elements of the protocol stack for signaling of the PHY, MAC, RLC, PDCP and/or RRC layers. In some embodiments, the baseband circuitry can include one or more audio digital signal processor(s) (DSP) 804f. The audio DSP(s) 804f can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 804 and the application circuitry 802 can be implemented together such as, for example, on a system on a chip (SOC).

In some embodiments, the baseband circuitry 804 can provide for communication compatible with one or more radio technologies. For example, in some embodiments, the baseband circuitry 804 can support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 804 is configured to support radio communications of more than one wireless protocol can be referred to as multi-mode baseband circuitry.

RF circuitry 806 can enable communication with wireless networks using modulated electromagnetic radiation through a non-solid medium. In various embodiments, the RF circuitry 806 can include switches, filters, amplifiers, etc. to facilitate the communication with the wireless network. RF circuitry 806 can include a receive signal path which can include circuitry to down-convert RF signals received from the FEM circuitry 808 and provide baseband signals to the baseband circuitry 804. RF circuitry 806 can also include a transmit signal path which can include circuitry to up-convert baseband signals provided by the baseband circuitry 804 and provide RF output signals to the FEM circuitry 808 for transmission.

In some embodiments, the RF circuitry 806 can include a receive signal path and a transmit signal path. The receive signal path of the RF circuitry 806 can include mixer circuitry 806a, amplifier circuitry 806b and filter circuitry 806c. The transmit signal path of the RF circuitry 806 can include filter circuitry 806c and mixer circuitry 806a. RF circuitry 806 can also include synthesizer circuitry 806d for synthesizing a frequency for use by the mixer circuitry 806a of the receive signal path and the transmit signal path. In some embodiments, the mixer circuitry 806a of the receive signal path can be configured to down-convert RF signals received from the FEM circuitry 808 based on the synthesized frequency provided by synthesizer circuitry 806d. The amplifier circuitry 806b can be configured to amplify the down-converted signals and the filter circuitry 806c can be a low-pass filter (LPF) or band-pass filter (BPF) configured to remove unwanted signals from the down-converted signals to generate output baseband signals. Output baseband signals can be provided to the baseband circuitry 804 for further processing. In some embodiments, the output baseband signals can be zero-frequency baseband signals, although this is not a requirement. In some embodiments, mixer circuitry 806a of the receive signal path can comprise passive mixers, although the scope of the embodiments is not limited in this respect.

In some embodiments, the mixer circuitry 806a of the transmit signal path can be configured to up-convert input baseband signals based on the synthesized frequency provided by the synthesizer circuitry 806d to generate RF output signals for the FEM circuitry 808. The baseband signals can be provided by the baseband circuitry 804 and can be filtered by filter circuitry 806c. The filter circuitry 806c can include a low-pass filter (LPF), although the scope of the embodiments is not limited in this respect.

In some embodiments, the mixer circuitry 806a of the receive signal path and the mixer circuitry 806a of the transmit signal path can include two or more mixers and can be arranged for quadrature downconversion and/or upconversion respectively. In some embodiments, the mixer circuitry 806a of the receive signal path and the mixer circuitry 806a of the transmit signal path can include two or more mixers and can be arranged for image rejection (e.g., Hartley image rejection). In some embodiments, the mixer circuitry 806a of the receive signal path and the mixer circuitry 806a can be arranged for direct downconversion and/or direct upconversion, respectively. In some embodiments, the mixer circuitry 806a of the receive signal path and the mixer circuitry 806a of the transmit signal path can be configured for super-heterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 806 can include analog-to-digital converter (ADC) and digital-to-analog converter (DAC) circuitry and the baseband circuitry 804 can include a digital baseband interface to communicate with the RF circuitry 806.

In some dual-mode embodiments, a separate radio IC circuitry can be provided for processing signals for each spectrum, although the scope of the embodiments is not limited in this respect.

In some embodiments, the synthesizer circuitry 806d can be a fractional-N synthesizer or a fractional N/N+8 synthesizer, although the scope of the embodiments is not limited in this respect as other types of frequency synthesizers can be suitable. For example, synthesizer circuitry 806d can be a delta-sigma synthesizer, a frequency multiplier, or a synthesizer comprising a phase-locked loop with a frequency divider.

The synthesizer circuitry 806d can be configured to synthesize an output frequency for use by the mixer circuitry 806a of the RF circuitry 806 based on a frequency input and a divider control input. In some embodiments, the synthesizer circuitry 806d can be a fractional N/N+8 synthesizer.

In some embodiments, frequency input can be provided by a voltage controlled oscillator (VCO), although that is not a requirement. Divider control input can be provided by either the baseband circuitry 804 or the applications processor 802 depending on the desired output frequency. In some embodiments, a divider control input (e.g., N) can be determined from a look-up table based on a channel indicated by the applications processor 802.

Synthesizer circuitry 806d of the RF circuitry 806 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+8 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency ($f_{LO}$). In some embodiments, the RF circuitry 806 can include an IQ/polar converter.

FEM circuitry 808 can include a receive signal path which can include circuitry configured to operate on RF signals received from one or more antennas 880, amplify the received signals and provide the amplified versions of the received signals to the RF circuitry 806 for further processing. FEM circuitry 808 can also include a transmit signal path which can include circuitry configured to amplify signals for transmission provided by the RF circuitry 806 for transmission by one or more of the one or more antennas 880.

In some embodiments, the FEM circuitry 808 can include a TX/RX switch to switch between transmit mode and receive mode operation. The FEM circuitry can include a receive signal path and a transmit signal path. The receive signal path of the FEM circuitry can include a low-noise amplifier (LNA) to amplify received RF signals and provide the amplified received RF signals as an output (e.g., to the RF circuitry 806). The transmit signal path of the FEM circuitry 808 can include a power amplifier (PA) to amplify input RF signals (e.g., provided by RF circuitry 806), and one or more filters to generate RF signals for subsequent transmission (e.g., by one or more of the one or more antennas 880.

In some embodiments, the UE device 800 can include additional elements such as, for example, memory/storage, display, camera, sensor, and/or input/output (I/O) interface.

Examples herein can include subject matter such as a method, means for performing acts or blocks of the method, at least one machine-readable medium including executable instructions that, when performed by a machine (e.g., a processor with memory or the like) cause the machine to perform acts of the method or of an apparatus or system for concurrent communication using multiple communication technologies according to embodiments and examples described.

Example 1 is an architecture configured to be employed within a network entity. The architecture includes a repository management component and a spectrum controller. The repository management component is configured to collect sensing information, generate a sensing map based on the collected sensing information and maintain an available spectrum in a database. The spectrum controller is configured to identify and handoff bands of the available spectrum according to the sensing map.

Example 2 is an architecture including the subject matter of example 1, wherein the sensing map includes coordinates associated with a geographic location.

Example 3 is an architecture including the subject matter of any of the examples 1-2, including or omitting optional elements, wherein the sensing map includes devices present.

Example 4 is an architecture including the subject matter of any of the examples 1-3, including or omitting optional elements, where the sensing map is associated with a plurality of bands of the available spectrum.

Example 5 is an architecture including the subject matter of any of the examples 1-4, including or omitting optional elements, wherein the sensing map indicates a presence of incumbents in the plurality of bands.

Example 6 is an architecture including the subject matter of any of the examples 1-5, including or omitting optional elements, where the repository management component is configured to maintain a map of rules for spectrum use.

Example 7 is an architecture including the subject matter of any of the examples 1-6, including or omitting optional elements, where the map of rules includes a tier structure provided by a regulatory body.

Example 8 is an architecture including the subject matter of any of the examples 1-7, including or omitting optional elements, where the repository management component is configured to generate a user map that includes rules for sharing and allocating bands of the available spectrum.

Example 9 is an architecture including the subject matter of any of the examples 1-8, including or omitting optional elements, wherein the spectrum controller is configured to utilize the sensing map, a user map and a map of rules to selectively handoff bands of the available spectrum.

Example 10 is an architecture including the subject matter of any of the examples 1-9, including or omitting optional elements, where the spectrum controller includes a sensing coordinator configured to trigger sensing devices to generate the sensing information.

Example 11 is an architecture including the subject matter of any of the examples 1-10, including or omitting optional elements, wherein the sensing devices include UEs, eNodeBs and dedicated sensing devices.

Example 12 is an architecture including the subject matter of any of the examples 1-11, including or omitting optional elements, where the repository management component includes a sensing module configured to combine the sensing information from the sensing devices and update the sensing map.

Example 13 is a spectrum coordinator arrangement to be employed within a network entity and one or more user equipments (UEs). The arrangement includes a sensing coordinator, a plurality of UEs, a dedicated sensor and a plurality of eNodeBs. The sensing coordinator is configured to trigger sensing by an entity to generate sensing information. The entity for sensing is associated with at least one sensing device of the plurality of UEs, the dedicated sensor and the plurality of eNodeBs.

Example 14 is an arrangement including the subject matter of the examples 13, including or omitting optional elements, where the entity is a mobile network operator (MNO).

Example 15 is an arrangement including the subject matter of any of the examples 13-14, including or omitting optional elements, where the entity is associated with a geographic location.

Example 16 is an arrangement including the subject matter of any of the examples 13-15, including or omitting optional elements, where the trigger is based on a request for a band within a geographic location.

Example 17 is an arrangement including the subject matter of any of the examples 13-16, including or omitting optional elements, where the trigger is in response to a request by the entity.

Example 18 is an arrangement including the subject matter of any of the examples 13-17, including or omitting optional elements, where the trigger includes a type of sensing to be performed.

Example 19 is an arrangement including the subject matter of any of the examples 13-18, including or omitting optional elements, where the trigger includes an area in which sensing is to be performed.

Example 20 is a computer-readable media having instructions that, when executed, cause one or more user equipments (UEs) to: generate a request for a band of an available spectrum by an operator; collect sensing information from one or more sensing devices; generate a sensing map based on the sensing information; identify an available band based on the sensing map; and handoff the available band to the operator.

Example 21 is a computer readable media including the subject matter of example 20, including or omitting optional elements, where the request includes a geographic area and a duration of time.

Example 22 is a computer readable media including the subject matter of any of examples 20-21, including or omitting optional elements, where the sensing map indicates incumbents within a geographic area.

Example 23 is a computer readable media including the subject matter of examples 20-22, including or omitting optional elements, where the sensing devices include an eNodeB.

Example 24 is a computer readable media including the subject matter of examples 20-23, including or omitting optional elements, further including to generate a user map that includes rules for sharing and allocating bands of the available spectrum.

Example 25 is a computer-readable media having instructions that, when executed, cause one or more user equipments (UEs) to: trigger sensing of information by one or more sensing devices, wherein the trigger includes trigger information; aggregate information from each of the one or more sensing devices into sensing information; and analyze the sensing information to generate a sensor map.

Example 26 is a computer readable media including the subject matter of any of example 25, including or omitting optional elements, where the trigger information includes direction of sensing.

Example 27 is a computer readable media including the subject matter of any of examples 25-26, including or omitting optional elements, where the trigger is based on a pre-determined period of time.

Example 28 is a computer readable media including the subject matter of any of examples 25-27, including or omitting optional elements, where the trigger is based on a pre-defined event.

Example 29 is an apparatus configured to be at least partially employed within an eNodeB. The apparatus includes a means for generating a request for a band of an available spectrum by an operator, a means for collecting sensing information from one or more sensing devices; a means for generating a sensing map based on the sensing information; a means for identifying an available band based on the sensing map; and a means for handing off the available band to the operator.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature may have been disclosed with respect to only one of several implementations, such feature may be combined with one or more other features of the other implementations as may be desired and advantageous for any given or particular application.

What is claimed is:

1. An architecture configured to be employed within a network entity, the architecture comprising:
    a repository management component configured to collect sensing information, generate a sensing map based on the collected information and maintain an available spectrum in a database; and
    a spectrum controller configured to receive a request for spectrum, obtain operator information associated with the request and selectively hand off bands of the available spectrum according to the sensing map, the request for spectrum and the operator information.

2. The architecture of claim 1, wherein the sensing map includes coordinates associated with a geographic region.

3. The architecture of claim 1, wherein the sensing map includes devices present.

4. The architecture of claim 1, wherein the sensing map is associated with a plurality of bands of the available spectrum.

5. The architecture of claim 4, wherein the sensing map indicates a presence of incumbents in the plurality of bands.

6. The architecture of claim 1, wherein the repository management component is configured to maintain a map of rules for spectrum use.

7. The architecture of claim 6, wherein the map of rules includes a tier structure provided by a regulatory body.

8. The architecture of claim 1, wherein the repository management component is configured to generate a user map that includes rules for sharing and allocating bands of the available spectrum.

9. The architecture of claim 1, wherein the spectrum controller includes a sensing coordinator configured to trigger sensing devices to generate the sensing information.

10. The architecture of claim 9, wherein the sensing devices include UEs, eNodeBs and dedicated sensing devices.

11. The architecture of claim 9, wherein the repository management component includes a sensing module configured to combine the sensing information from the sensing devices and update the sensing map.

12. The architecture of claim 1, further comprising a spectrum broker configured to perform brokering of trade requests for spectrum and to update the repository management component based on changed ownership.

13. A spectrum coordinator arrangement to be employed within a network entity and one or more user equipment (UEs), the arrangement comprising:
    a sensing coordinator configured to trigger sensing by an entity to generate sensing information and verify authority of the entity to access spectrum based on an operator tier; wherein the trigger includes a location for sensing, a number of measurement points for sensing, a direction of sensing, and a duration of sensing;
    a dedicated sensor configured to at least partially generate the sensing information; and
    wherein the entity is associated with at least one sensing device of a plurality of UEs, the dedicated sensor and a plurality of eNodeBs.

14. The arrangement of claim 13, wherein the entity is associated with a geographic location.

15. The arrangement of claim 13, wherein the trigger is based on a request for a band within a geographic location.

16. The arrangement of claim 13, wherein the trigger includes an area in which sensing is to be performed.

17. One or more computer-readable media having instructions that, when executed, cause one or more user equipments (UEs) to:
    generate a request for a band of an available spectrum by an operator;
    obtain operator information associated with the request;
    collect sensing information from one or more sensing devices;
    generate a sensing map based on the sensing information;
    identify an available band based on the sensing map, the request and the operator information; and
    hand off the available band to the operator.

18. The computer-readable media of claim 17, wherein the request includes a geographic area and duration of time.

19. The computer-readable media of claim 17, further comprising to generate a user map that includes rules for sharing and allocating bands of the available spectrum.

20. One or more computer-readable media having instructions that, when executed, cause one or more user equipments (UEs) to:
    trigger sensing of information relating to a use of spectrum by one or more sensing devices, wherein the trigger includes trigger information;
    verify authority to access requested spectrum based on an operator tier;
    aggregate information from each of the one or more sensing devices into sensing information; and
    analyze the sensing information to generate a sensor map.

21. The computer-readable media of claim 20, wherein the trigger information includes direction of sensing.

22. The computer-readable media of claim 20, wherein the trigger is based on a pre-determined period of time.

* * * * *